United States Patent [19]

Spiero

[11] Patent Number: 4,896,229
[45] Date of Patent: Jan. 23, 1990

[54] APPARATUS FOR REPRODUCING VIDEO SIGNALS AT A SPEED WHICH DEVIATES FROM A NOMINAL SPEED

[75] Inventor: Richard C. Spiero, Eindhoven, Netherlands

[73] Assignee: U.S. Philips Corporation, New York, N.Y.

[21] Appl. No.: 206,950

[22] Filed: Jun. 8, 1988

Related U.S. Application Data

[63] Continuation of Ser. No. 854,065, Apr. 17, 1986, abandoned, which is a continuation of Ser. No. 437,582, Oct. 29, 1982, abandoned.

[30] Foreign Application Priority Data

Apr. 19, 1982 [NL] Netherlands .................. 8207614

[51] Int. Cl.$^4$ ............................................... G11B 5/58
[52] U.S. Cl. ................................. 360/77.14; 360/10.2
[58] Field of Search ..................... 360/10.3, 70, 74.4, 360/77.05, 77.14, 77.15, 77.16

[56] References Cited

U.S. PATENT DOCUMENTS

4,297,733 10/1981 Sanderson ........................... 360/77
4,439,799 3/1984 Haubrich et al. .................... 360/77

OTHER PUBLICATIONS

IEEE-Trans. Consum. Electronics (U.S.A.), vol. CE-26, No. 1, Feb. 1980, Azuma et al., "Microprocessor Controlled Variable Play-Back Speed System for Video Tape Recorder".

Primary Examiner—Aristotelis M. Psitos

[57] ABSTRACT

A video recorder which is adapted to reproduce video signals recorded on a record carrier in the form of a tape in tracks which are parallel to each other and which are inclined relative to the longitudinal axis of the record carrier at a speed which deviates from the nominal speed. The video recorder comprises tracking-error detection means for detecting the deviation of the read head from the center of the track to be followed. The generated tracking-error signal is applied to the tape-transport control loop. For the purpose of tracking-error detection a reference-signal generator generates reference signals which form an identification for the track to be followed. For reproduction with a deviating speed these reference signals are generated in such a pattern that this pattern corresponds to the sequence of tracks which the head would scan in the case of a free uniform motion with a constant-tape transport speed which deviates from the nominal speed, so that when such a pattern is generated the tape-speed control will establish a tape-transport speed corresponding to this pattern.

4 Claims, 4 Drawing Sheets

APPARATUS FOR REPRODUCING VIDEO SIGNALS AT A SPEED WHICH DEVIATES FROM A NOMINAL SPEED

This is a continuation of application Ser. No. 854,065 filed Apr. 17, 1986, now abandoned, which was a continuation of Ser. No. 437,582 filed Oct. 29, 1982, now abandoned.

BACKGROUND OF THE INVENTION

The invention relates to an apparatus for reproducing video signals at a speed which deviates from a nominal speed, which video signals have been recorded on a record carrier in the form of a tape in mutually parallel tracks which are inclined relative to the longitudinal axis of the record carrier, which apparatus comprises tracking-error detection means for detecting the instantaneous deviation of a read head relative to the center of a track to be followed, a reference-signal generator for generating reference signals for the tracking-error detection means in order to generate a tracking-error signal which is a measure of the deviation of the read head relative to the center of the track corresponding to the generated reference signal, said reference signals being distinguishable within cycles of at least three tracks, and a tape-transport control loop for controlling the tape transport as a function of said tracking-error signal.

Such an apparatus is inter alia known from United States Patent Specification no. 4,297,733 herewith incorporated by reference. The known apparatus employs long wave track-sensing signals recorded in the tracks, the head reading the track-sensing signals produced by crosstalk from two adjacent tracks during the read-out of a specific track. The reference signals are mixing signals which, upon being mixed with the signals read by the head and containing the two crosstalk signals, result in mixing products which are filtered out to form a tracking-error signal. These mixing signals change with each track being read in a cycle of four. Other methods are also known, as, for example, consecutive tracks may be distinguished for the purpose of deriving a tracking-error signal by recording track-sensing signals at different locations in consecutive tracks. The reference signals are then time-reference signals for defining time windows by means of which said track-sensing signals can be identified and read. Alternatively, phase-reference signals may be used, or combinations of the said signal types.

During playback at the nominal tape speed, the tracking signal is utilized in order to ensure that the head follows the track. This may be effected by controlling the head position by means of actuators or by controlling the tape-transport speed.

During playback at a speed which deviates from the nominal tape speed, tracks are read several times (slow moition or still picture) or tracks are skipped (fast motion). For this purpose the reference signals are generated in a specific pattern from which reference signals may be repeated in the case of slow motion production and reference signals may be skipped in the case of fast motion. When actuators are used, the head always follows the track corresponding to the instantaneously generated reference signal. If the method of controlling the tape-transport speed is used, the head will not follow the track exactly, because such a control system is much too slow for this, but scans the tracks obliquely. However, the control system does ensure that on the average the head follows the track which corresponds to the generated tracking signal.

When actuators are used any deviating tape transport speed is possible, in principle, without problems. The actuators ensure a correct tracking regardless of the tape-transport speed. When a tape-transport speed control system is used for tracking control, only a limited number of speeds which deviate from the nominal tape-transport speed are possible. For example, playback with a speed which is two times as slow or two times as fast is possible by repeating each reference signal twice or by skipping every second reference signal. A limited number of multiples or submultiples of the nominal transport speed are also possible. As an example, playback with a speed which is two and a half times as slow is possible by alternately repeating the reference signals two times and three times.

SUMMARY OF THE INVENTION

It is an object of the invention to provide an apparatus of the type mentioned in the opening paragraph, which, in principle, permits reproduction with any tape-transport speed which deviates from the nominal speed, the tape transport being controlled as a function of the tracking signal.

To this end the invention is characterized in that for reproducing the information in the tracks on the record carrier with a speed which deviates from the nominal speed, at which deviating speed the read head follows a path on the record carrier which does not extend parallel to the tracks, the reference-signal generator is adapted to generate a predetermined pattern of reference signals, which predetermined pattern is so selected that the reference signals correspond to those tracks on which the head is situated in the case of a one-way straight line motion of the head in a direction which is inclined relative to the track direction, which direction corresponds to the direction associated with said deviating speed.

The step in accordance with the invention permits a smooth transition from a tape position corresponding to a specific track to a tape position corresponding to a following track by gradually shifting the instant of track change, so that any desired tape-transport speed is possible while maintaining the tape-transport speed control in response to the tracking-error signal.

In order to generate the desired pattern of reference signals in a simple manner, the apparatus in accordance with the invention may be further characterized in that at a speed which deviates from the nominal scanning speed, the sequence of reference signals is obtained in that in the sequence of reference signals which corresponds to reproduction with the nominal playing speed, switching forward is effected with a first frequency and additional switching is effected with a second frequency.

In this respect it is advantageous that the first frequency corresponds to the number of tracks scanned per second at the nominal playing speed.

In particular for flow-motion reproduction of the recorded pictures this embodiment may be further characterized in that with the second frequency, switching is effected in a backward sense compared with the direction in which switching is effected with the first frequency. This embodiment may be further characterized in that it comprises a counter, to which counting signals of the said frequencies are applied. For fast-motion reproduction of the recorded pictures this embodiment may be further characterized in that switching forward is effected with the second frequency.

During the "still picture" scanning mode, the position of the path followed by the head relative to the tracks determines the location of interference zones in the reproduced picture. In order to ensure that these interference zones are disposed at a specific location in the picture where they are at least annoying, the preferred embodiment of the apparatus in accordance with the invention may be further characterized in that the apparatus comprises a phase detector for detecting the phase relationship between the signals of the first and the second frequency during reproduction with a tape-transport speed equal to zero, in order to control the point where the head, each time, changes to another track. This last-mentioned embodiment may be further characterized in that the apparatus further comprises a variable-frequency oscillator for generating a signal of the second frequency, which variable oscillator, together with the phase detector, is arranged in a phase-locked loop during reproduction with a tape-transport speed equal to zero.

As a result of this step, the oscillator frequency is locked to the signal of the first frequency, so that the "still picture" mode can always be obtained within a specific range.

This preferred embodiment may be further characterized in that the apparatus comprises a control-signal generator, for example a potentiometer, for generating a control signal for the variable oscillator and, this control-signal generator is moreover combined with the tape-transport control loop as a feed-forward control.

DESCRIPTION OF THE DRAWINGS

The invention will now be described in more detail, by way of example, with reference to the drawings. In the drawings.

DESCRIPTION OF THE PREFERRED EMBODIMENT

Figure 1:
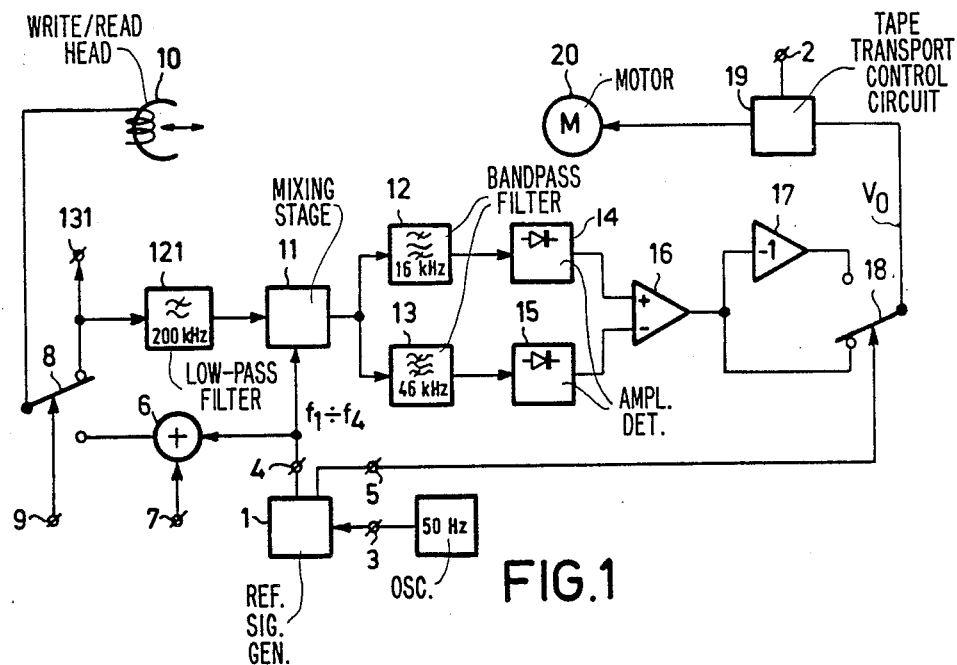
FIG. 1 is the circuit diagram of an apparatus to which the invention principle may be applied.

FIG. 1 is the circuit diagram of an apparatus to which the inventive principle may be applied. This apparatus is in conformity with the afore-mentioned United States Patent Specification no. 4,297,733 (PHN 8728). The principle in accordance with the invention will be described on the basis of the tracking method described in this reference, but it will be appreciated that other tracking methods are possible to which the inventive principle may be applied.

The apparatus comprises a reference signal generator 1 which generates a specific sequence of reference signals having different frequencies $f_1$, $f_2$, $f_3$ and $f_4$, for example 102, 118, 164 and 148 kHz, respectively. These signals are applied to an adder 6 to be added to a video signal applied to an input 7 during recording, which combined video signal is then transferred to a write/read head 10 via a switch 8, which is actuated in accordance with the "recording" and "playback" modes. In a two-head recorder the write/read head 10 in fact comprises two heads which are alternately used. In addition, the output signals of the reference-signal generator 1 are applied to a mixing stage 11 which also receives the read-out reference signals of the frequencies $f_1$, $f_2$, $f_3$ and $f_4$ from the write/read head 10 via a low-pass filter 121 and the switch 8 in the "playback" mode. The read-out video signal is available at an output 131 between the switch 8 and the filter 121.

The recorded pattern of frequencies—at least in the present apparatus—is such that the frequency difference between the crosstalk signal from one adjacent track and a mixing signal, which in the present apparatus is identical to the reference signal recorded in the track to be followed, is equal to a specific frequency (in the present example 16 kHz) and the frequency difference between the crosstalk signal from the other adjacent track and the mixing signal is equal to another specific frequency (in the present example 46 kHz). The situation is now such that when a specific track is followed, one different frequency corresponds to one adjacent track and the other difference frequency to the other adjacent track, and the other way around when a following track is to be scanned.

In the apparatus shown in FIG. 1 the foregoing is achieved in that the output signal of the mixing stage 11, which signal comprises components of the difference frequencies, is applied in parallel to respective band-pass filters 12 and 13 which have pass bands around the frequencies 16 and 46 kHz, respective respectively. The amplitudes of the output signals of the filters 12 and 13 are determined by means of amplitude detectors 14 and 15, respectively and the difference of these amplitudes is determined by means of a differential amplifier 16. An inverter 17 and a switch 18 cancel the previously mentioned change of the different frequencies associated with the respective adjacent tracks upon a change from one track to be followed to another track to be followed, for which purpose the switch 18 is also controlled by the reference-signal generator 1. The amplitude of the signal $V_o$ appearing after the switch 18 is then a measure of the deviation of the head 10 relative to the center of the track to be followed and the polarity of the signal $V_o$ indicates the direction of the tracking error. The tracking-error signal $V_o$ is applied to a tape-transport control circuit 19 which controls a tape-transport motor 20.

Figure 2:
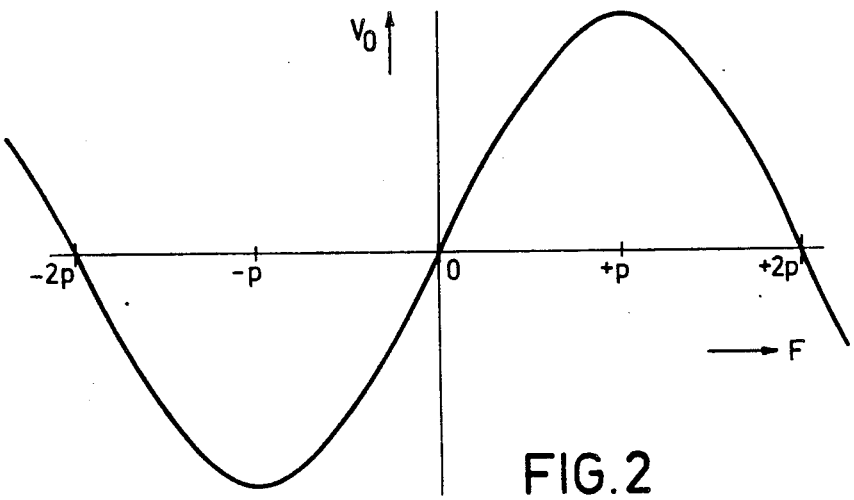
FIG. 2 shows the tracking-error signal $V_o$ as a function of the tracking error.

FIG. 2 shows the tracking-error signal $V_o$ as a function of the tracking error F, which is plotted along the associated axis in relation to the track pitch p. This tracking-error signal $V_o$ is periodic over four tracks.

Figure 3:
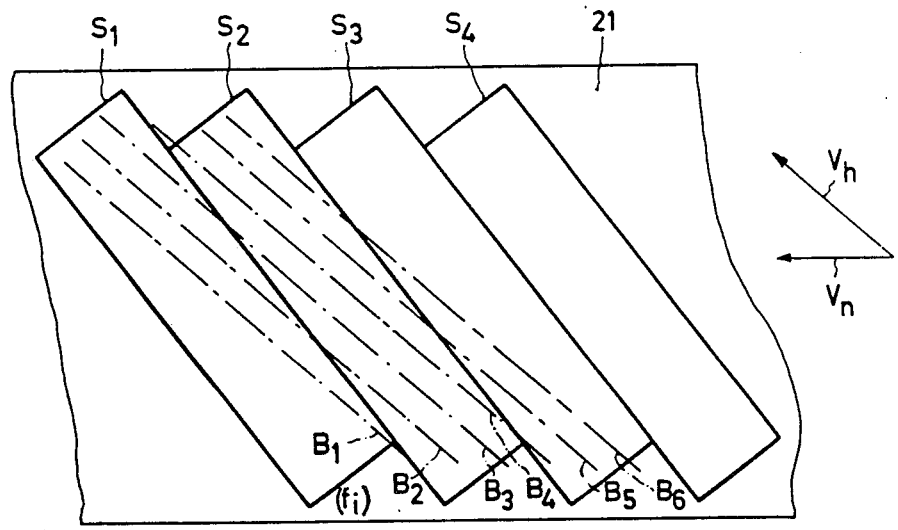
FIG. 3 shows the paths of a head across the recorded track pattern at a scanning speed which is ⅓ of the nominal speed.

FIG. 3 schematically shows a recording tape 21 and the video signals recorded on this tape in the form of tracks, of which four consecutive tracks $S_1$, $S_2$, $S_3$ and $S_4$ are shown. These tracks also contain the reference signals of the frequencies $f_1$, $f_2$, $f_3$ and $f_4$, respectively, which cycle recurs periodically when video pictures are recorded. During normal playback, the control system shown in FIG. 1 ensures that the head 10 follows the tracks of $S_1$, $S_2$, $S_3$ and $S_4$ in this order, for which purpose the head 10 is moved with a velocity $V_h$, which is vectorially represented in FIG. 3, and the tape is moved with the vectorially represented velocity $V_n$.

Figure 4:
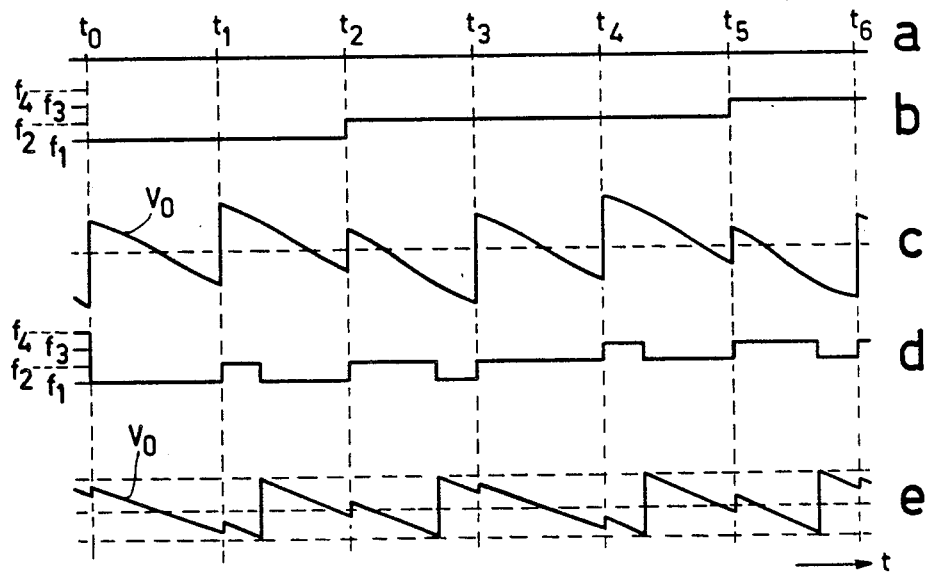
FIGS. 4a–4e show some signal waveform appearing in the apparatus shown in FIG. 1 in the case of the scanning cycle shown in FIG. 3, FIGS. 5a–5f show the pattern of reference signals to be generated at the various scanning speeds.

For reproducing pictures in a fast-motion, slow-motion or even in the still and reverse modes, the tape transport speed $V_n$ may be changed. In addition to the speed with which the pictures corresponding to the consecutive tracks are reproduced, the direction in which the head 10 scans the tracks is then changed. This will be explained by describing the situation which occurs when tape transport is effected with ⅓ of the nominal speed $V_n$, FIG. 4 diagrammatically representing the consecutive reference signals. FIG. 4a represents the time axis, FIG. 4b the sequence of the reference signals to be generated, which reference signals are the mixing signals for the mixing stage 11 if these reference signals are generated in a correspondingly delayed cycle, FIG. 4c represents the tracking-error signal then produced, FIG. 4d represents the sequence of the reference signals when the inventive principle is applied, and FIG. 4e represents the the resulting tracking-error signal $V_o$.

At the speed ⅓ $V_n$, the broken lines in FIG. 3 represent the centers of six paths $B_1$ to $B_6$ which are consecutively followed by the head 10 in a one-way straight line motion. These paths $B_1$ to $B_6$ deviate from the track direction and extend across more than one track, scanning of these paths being started consecutively at the instants $t_0$ to $t_5$ indicated in FIG. 4a. In the situation shown, it is assumed that at the instant $t_0$ a path is started which intersects the central axis of the track $S_1$ halfway. In order to follow this path $B_1$ a reference signal $f_1$ is generated. The track position in the situation shown is then such that the deviation F (FIG. 2) is approximately ½p at the beginning and at the end. The control signal $V_o$ then varies as shown in FIG. 4c. At the instant $t_1$ the scanning of path $B_2$ is started, which path is shifted by ⅓ p relative to the path $B_1$. At the beginning of the path $B_1$ the track deviation has increased (approximately 1p in the present case) so that the signal $V_o$ at the instant $t_1$ has also increased. At the instant $t_2$ the reference signal changes and during the next three scans a reference signal of the frequency $f_2$ is generated until at the instant $t_5$ at the beginning of the path $B_6$ the frequency of the generated reference signal changes to the frequency $f_3$.

Depending on the scanning speed the paths $B_1$–$B_6$ will extend across several tracks and the maximum of the control signal $V_o$ will be equal to the maximum shown in FIG. 2 for a track deviation equal to 1p. The tape-transport speed will be controlled in such a way that the d.c. level of the signal $V_o$ remains substantially zero.

In accordance with the invention, a more attractive tape-transport control is obtained when the pattern of frequencies $f_1$ to $f_n$ is such that when the (nominal) path B is to change to another track, the frequency changes accordingly. For example, the path $B_2$ commencing at the instant $t_1$ will intersect the boundary between the tracks $S_1$ and $S_2$ after approximately one third of its length. Accordingly, the reference signal frequency will also change at ⅓ of the time interval between the instants $t_1$ and $t_2$. The pattern of frequency changes thus required is as shown in FIG. 4d while FIG. 4e shows the corresponding tracking-error signal $V_o$. In the case of a correct tape-transport speed this error signal has a maximum value which corresponds to a track deviation equal to ½p, because each time when a path B changes to another track, the frequency of the reference signal changes also.

A comparison of FIG. 4e with FIG. 4c clearly shows that the error signal shown in FIG. 4e varies far more gradually and has a smaller amplitude than the error signal shown in FIG. 4c.

The desired pattern of reference signals can be generated very simply when switching is effected in the sequence $f_1, f_2, f_3, f_4, f_1 \ldots$ and so on with a first frequency $f_f$ which is equal to the nominal number of tracks to be followed per second, in the present example 50 Hz, in addition to which switching back is effected with a frequency $f_c$ and switching forward with a frequency $f_{c'}$. For the slow-motion and reverse modes this means that:

$$v/v_n = (f_f - f_c)/f_f$$

where v is the playback speed and $v_n$ the nominal playback speed. For example, for $f_c = 60$ Hz ($f_f = 50$ Hz) the speed for the reverse mode is then 1/5 of the nominal speed. For the fast-motion mode the following is valid:

$$v/v_n = (f_f + f_{c'})/f_f$$

Figure 5:
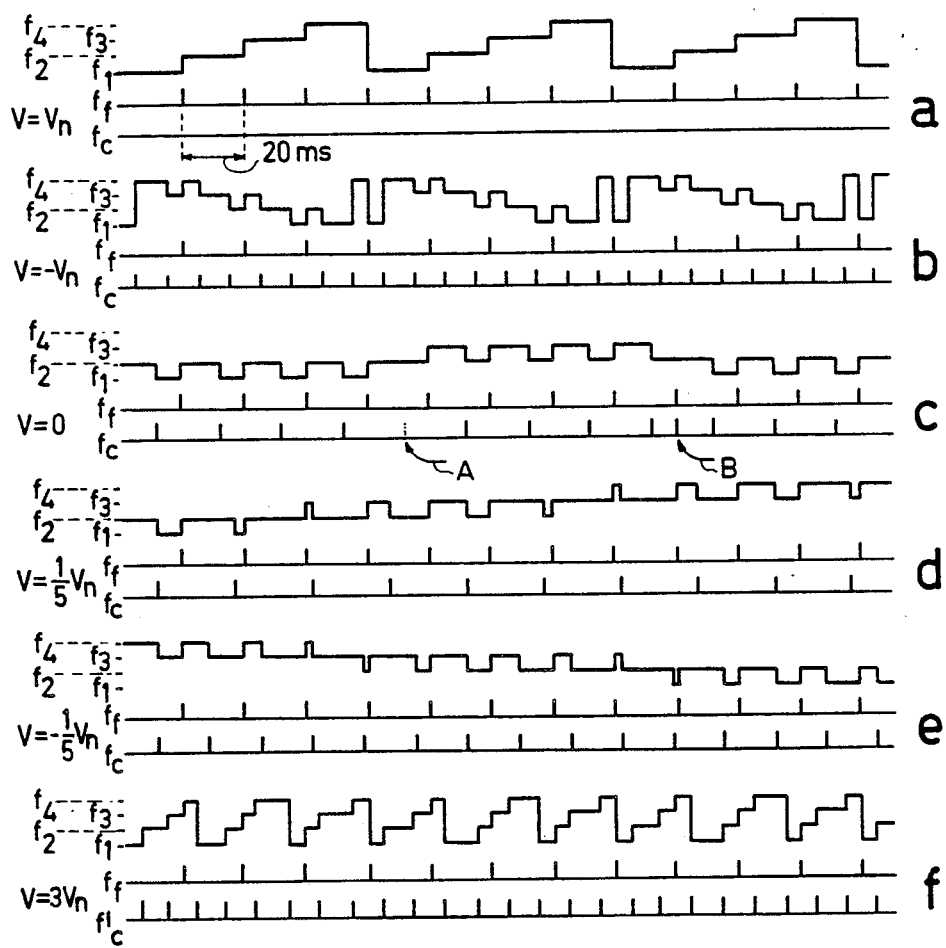

FIG. 5 shows the switching instants as pulse trains of the frequencies $f_f$ and $f_c$ (or $f_{c'}$) and also shows the corresponding patterns of reference signals.

The diagrams a to f in this order correspond to the speeds $v/v_n = +1, -1, 0, +1/5, -1/5,$ and $+3$. Diagram c shows that at the instants A and B, respectively, a forward and backward jump by one picture respectively are obtained by suppressing one pulse of the sequence of the frequency $f_c$ and by adding one additional pulse to the sequence of the frequency $f_c$, respectively.

The patterns of reference signals as shown in FIG. 5 can be generated in the reference-signal generator 1 (FIG. 1).

Figure 6:
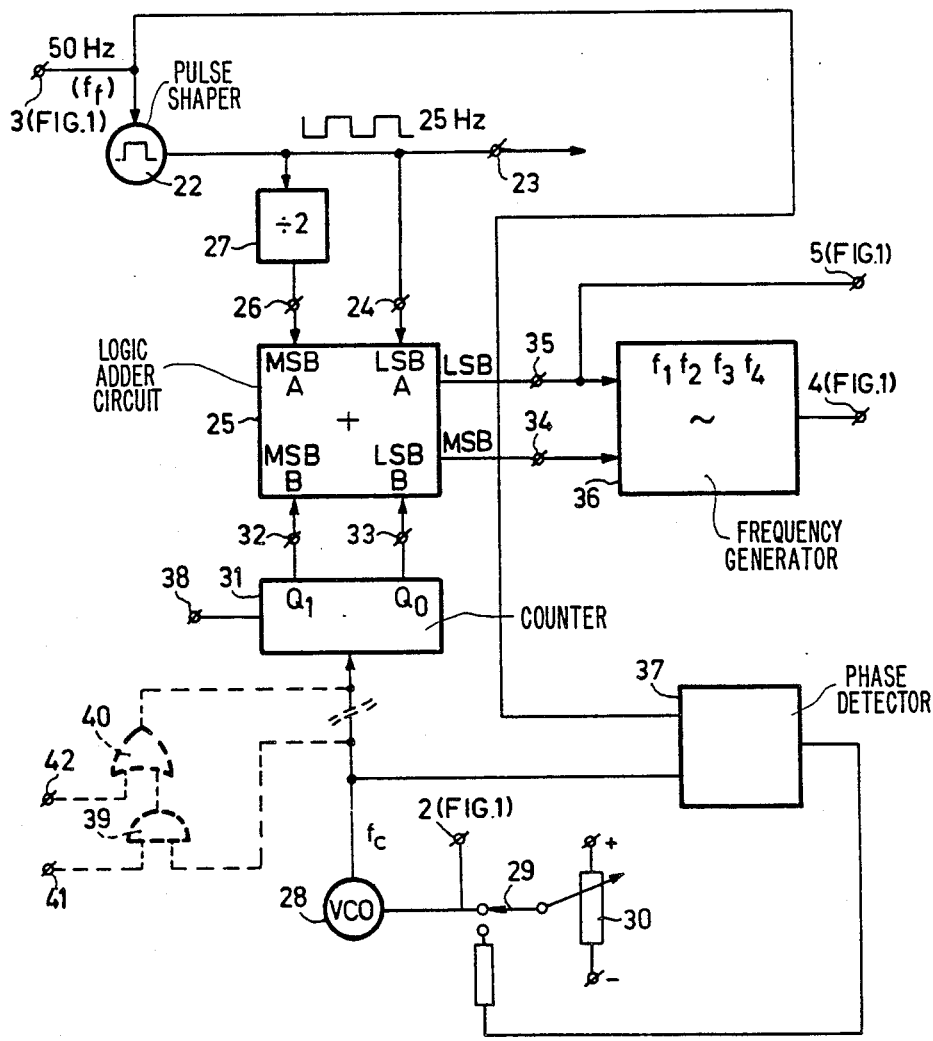
FIG. 6 shows a version of the reference signal generator 1 (FIG. 1) embodying the inventive principle.

FIG. 6 shows a preferred embodiment of such a reference-signal generator. It comprises an input 3 for receiving pulses having a repetition frequency $f_f$ (in the present example 50 Hz) from which a symmetrical pulse-shaped signal of a frequency of 25 Hz is derived in a pulse shaper 22. This 25-Hz signal is available on an output 23 and may serve as switching signal for the head change in a two-head helican-scan video recorder. The 25-Hz signal is applied to an input 24 of a logic adder circuit 25, which input 24 constitutes the input for the least-significant bit of the two-bit input 24,26. The 25-Hz signal is applied to the input 26 for the most-significant bit via a divide-by-two divider 27. Consequently, the decimal value of the signal pair on inputs 24 and 26, which pair forms a two-bit binary signal, varies from 0 to 3 in a rhythm equal to $f_f (=50$ Hz).

The circuit arrangement shown in FIG. 6 further comprises a pulse generator 28 which is voltage-controlled by the voltage at an inut 29 and which supplies pulses having a repetition frequency equal to f. The repetition frequency is determined by the voltage on the wiper of a potentiometer 30. A two-bit down-counter 31 converts the pulses from the oscillator 28 into a two-bit binary code which is available on outputs $Q_0$ and $Q_1$ of the down-counter 31, which outputs are connected to the inputs 32 and 33 of the adder 25. Thus, the adder 25 operates in a rhythm which is determined by the frequency difference $f_f - f_c$. The adder 25 comprises two outputs 34 and 35 on which the count appears as a two-bit binary code and which varies decimally from 0 to 3 in a rhythm equal to $f_f - f_c$. The outputs 34 and 35 are connected to a frequency generator 36 which, in response to the count on said outputs, generates the frequency $f_1, f_2, f_3$ or $f_4$, so that the desired pattern of reference signals appears on an output 4 of this generator 36.

The least-significant bit on output 35 of the adder 25 always changes in synchronism with the changes of the frequencies $f_1$ to $f_4$. By applying this least-significant bit to an output 5, a signal for actuating the switch 18 (FIG. 1) is obtained.

In the "still picture" mode as shown in diagram 5c the pulses of the frequency $f_c$ and the corresponding frequency changes in the reference signal, determine the location where the corresponding path B, followed by the head (see FIG. 3), intersects the boundary between two adjacent tracks. As the tracking mechanism controls the tape transport in such a way that the average value of the signal $V_o$ (as shown in FIG. 4e) becomes zero, this means that the track change is controlled towards the center of the track, which is favorable because the corresponding interference zones in the picture is then least annoying. However, this applies only if the frequency $f_c$ is exactly equal to the frequency $f_f$ which is never possible in practice when the frequency $f_c$, as is shown in Figure, is adjusted by means of a manually controlled potentiometer which would give rise to a slowly advancing picture but also to a moving interference zone. In the embodiment shown in FIG. 6, this problem is precluded by arranging the oscillator $f_c$, in the present case, with the frequency $f_f$ in a phase-locked loop. For this purpose the phase difference between the signals of the frequencies $f_c$ and $f_f$ (or between other corresponding signals) is measured by means of a phase detector 37 and the control voltage on input 29 of the oscillator 28 is corrected by the output signal of the phase detector 37.

In FIG. 6 point 29, which is, is connected to an output 2. This output 2 is connected to a corresponding input 2 in the circuit arrangement shown in FIG. 1 in order to provide a feed-forward control for the tape-transport-speed control circuit 19. As will be understood by those of ordinary skill, this feed-forward voltage will cause the control circuit 19 to have an output voltage prodocing approximately the desired tape speed while the down-counter 31 is operating at a frequency $f_c$. This control circuit 19 is then preset to an output appropriate to the frequency $f_c$ in confirmity with the setting of the oscillator 28.

FIG. 5f shows the situation for a playback speed which is higher than the nominal playback speed. For this purpose it is necessary that in the frequency cycle $f_1$, $f_2$, $f_3$ and $f_4$, switching is effected with the frequencies $f_f$ and $f_{c'}$. This may be achieved by using a reversible up/down-counter having a switching input 38 as the counter 31.

The diagram in FIG. 5c shows that it is possible to switch one "picture forward" or one "picture backward" by suppressing a pulse of the sequence of the frequency $f_c$ or by adding a pulse to this sequence. In the circuit arrangement shown in FIG. 6, this may be achieved by, for example, suitably modifying the adder 23 or by suppressing or adding a pulse in the output signal of the oscillator 28, a pulse being substracted from or added to this output signal, for example, by means of the gates 39 and 40, respectively, and inputs 41 and 42, respectively, as indicated by the broken lines.

In the "recording" mode the reference signal pattern shown in diagram 5a must be generated in the circuit arrangement shown in FIG. 1 in the same way as during normal playback. This pattern is obtained for $f_c=0$, and may be achieved, for example, by controlling the oscillator 28 to obtain the frequency $f_c=0$ or by providing a disabling facility at a suitable location, such as in the counter 31. Those of ordinary skill in the recording arts will recognize that, in these operating modes, the error voltage $V_0$ will normally be approximately zero, and the approximate motor voltage necessary to drive the motor 20 at normal speed will be derived in any well known fashion in control circuit 19.

I claim:
1. An apparatus for reproducing video signals recorded on a record carrier in mutually parallel tracks which are inclined relative to the longitudinal axis of the record carrier, at a speed which deviates from a nominal speed, said carrier including means for identifying individual consecutive tracks within a cycle of at least three tracks, said cycles repeating in succession along said axis, said apparatus comprising:

a tape transport for moving said record carrier along the longitudinal axis thereof;

a read head for reading the video signals in said parallel tracks;

means for repeatedly moving said read head in one direction, at a constant speed, along a path which is inclined relative to said longitudinal axis of said record carrier, wherein said path is substantially parallel to said parallel tracks when said tape transport moves said record carrier at a nominal speed;

tracking-error detection means for generating a tracking-error signal which is a measure of the deviation of the read head relative to the center of a track being followed;

a tape transport control loop for receiving said tracking-error signal for controlling the direction and speed of said tape transport;

a reference signal generator coupled to said tracking-error detection means for generating, at a predetermined rate, a sequence of reference signals therefor corresponding to said means for identifying consecutive tracks on said record carrier;

characterized in that said reference signal generator comprises means for advancing said reference signals to the next reference signal of the sequence at a succession of equally spaced instants of time, and means selectively causing the reference signal to advance to the next reference signal or to return to the immediately preceding reference signal at instants of time different from said succession of equally spaced instants of time, thereby forming a modified sequence of reference signals corresponding to those tracks to be followed by said read head when the path thereof is inclined relative to said tracks and wherein said succession of equally spaced instants corresponds to a first frequency, and said means for selectively causing operates at a selectively adjustable second frequency, said first frequency corresponding to the number of tracks scanned per second at the nominal playing speed, switching with a second frequency being effected in a backward sense compared with the direction in which switching is affected with said first frequency and switching means comprising means for providing a signal of said first frequency, means for converting said first frequency signal into a first counting signal, a variable frquency oscillator for generating a signal of said second frequency, a counter coupled to said variable frequency oscillator for converting said second frequency signal into a second counting signal, an adder for adding together said first and second counting signals, and a frequency generator coupled to an output of said adder for generating each of said reference signals in dependence on the sum of said counting signals.

2. An apparatus as claimed in claim 1, characterized in that at a speed which is greater than said nominal speed, switching forward is effected with the second frequency.

3. An apparatus as claimed in claim 1, characterized in that the switching means further comprises a phase detector coupled to said providing means and said variable frequency oscillator for detecting the phase relationship between signals of the first and the second frequency during reproduction with a tape-transport speed equal to zero, an output of said phase detector being selectively coupled to a control input of said variable frequency oscillator.

4. An apparatus as claimed in claim 1, characterized in that the switching means further comprises a control-signal generator in the form of a potentiometer, for selectively generating a control signal for the variable frequency oscillator.

* * * * *